Patented Jan. 8, 1935

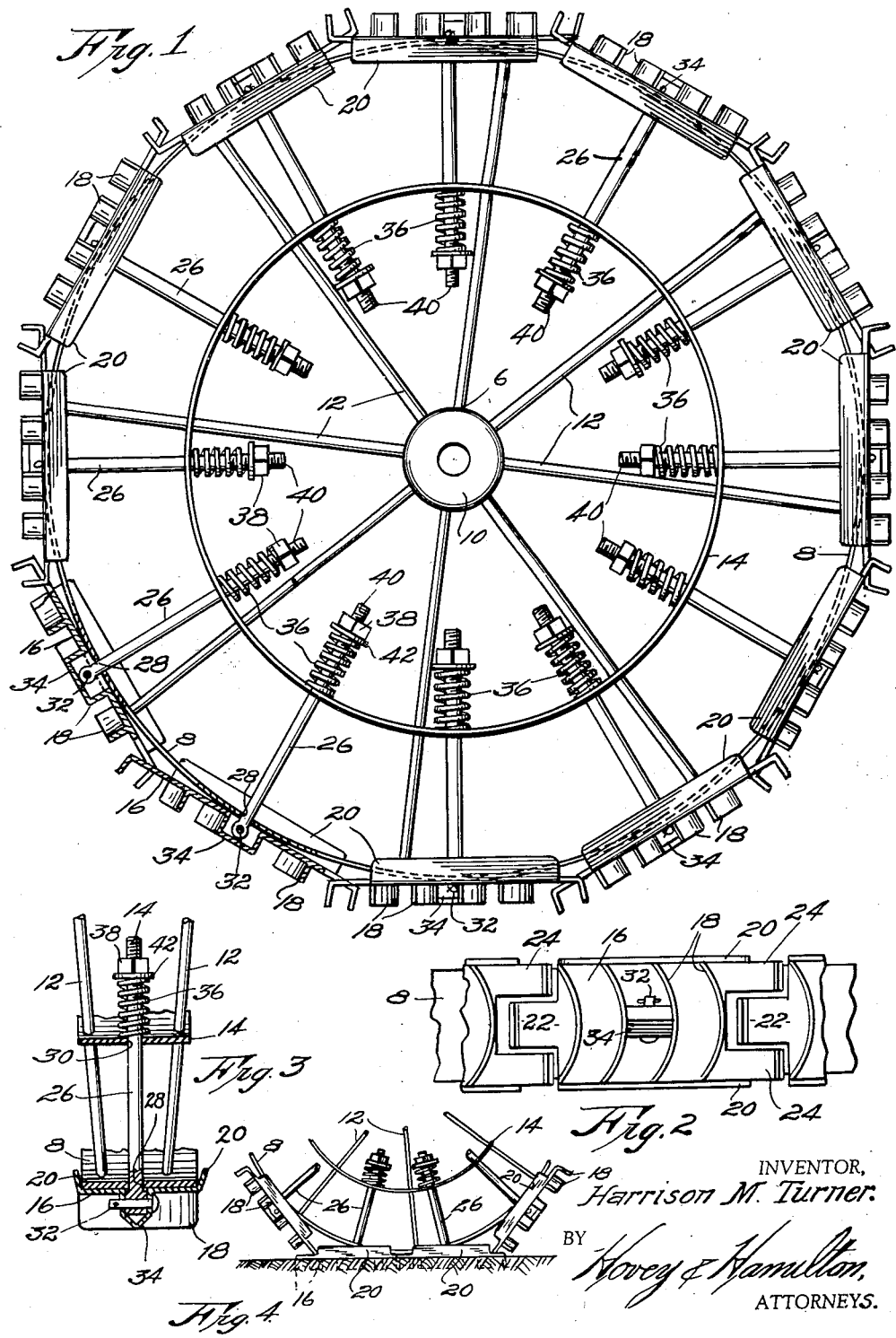

1,987,314

UNITED STATES PATENT OFFICE 1,987,314

TRACKLAYING WHEEL

Harrison M. Turner, Kansas City, Mo.

Application May 8, 1933, Serial No. 669,922

4 Claims. (Cl. 305—13)

This invention relates to wheels for vehicles of any type where road or traveling conditions require that the rim of the wheel or outer annular rolling surface thereof be kept on a substantially planar track which rests upon the road surface that would normally allow sinking of the wheel rim to such an extent that a vast amount of excessive power would be required to drive the vehicle were the track presenting the planar surface not present.

The primary object of this invention is to provide a vehicle wheel having a series of independent tread plates arranged at the rim thereof in such a manner that a track is laid for the wheel as the same is rotated about its axis, such track consisting of one or more of the tread plates which rockingly engage the outer annular periphery of the wheel rim in such a manner that a smooth rolling surface is always presented immediately in front of the tread plate disposed on the true vertical axis of the wheel between the wheel rim and the road surface.

Another object of this invention is the contemplation of a track laying wheel having a series of tread plate units carried thereby, the tread plates of adjoining units being overlapped and held against the outer annular periphery of the wheel rim by radially extending stems having a novel adjusting means associated therewith and unique interconnecting structure for securing together the parts of the unit.

Minor objects of the invention including details of structure and points of advantage will appear during the course of the following specification, referring to the accompanying drawing, wherein:

Figure 1 is a side elevation of a track laying wheel made to embody the concepts of this invention.

Fig. 2 is a fragmentary, edge elevation of the same.

Fig. 3 is a fragmentary section through one of the tread plate units, and

Fig. 4 is a fragmentary, side elevation showing tread plates in another position.

While a wheel of one type is shown to illustrate the invention, it is understood that any other type of wheel might be provided with parts made in accordance with this invention. In the instance illustrated, wheel 6 has an outer rim 8 and a hub 10 which is disposed at the axis of annular rim 8. Spokes 12 join hub and rim 10 and 8 respectively and an intermediate inner ring 14 is placed upon spokes 12 between hub 10 and rim 8. Spokes 12 and rim and ring 8 and 14 respectively are assembled in a fashion shown in Fig. 3. The wheel structure just described is common and well known in the art, and it is with such structure that the more important elements making up the invention are associated.

A large number or series of tread plates 16 having cleats 18 formed on one face thereof and inturned flanges 20 along each longitudinal edge respectively thereof is placed in end-to-end relation around the outer annular face of rim 8. Each tread plate 16 is flat or planar and the ends thereof are formed to present central and outer tongues 22 and 24 respectively, whereby the adjoining tread plates overlap. The distance between flanges 20 is substantially the same as rim 8 and these flanges diverge as clearly shown in Fig. 3. Through the use of such structure, lateral relative movement between tread plate 16 and rim 8 is precluded, yet the rocking movement so necessary is permitted. These flanges not only serve as guide walls, but likewise guard against the introduction of foreign matter between the inner flat face of tread plate 16 and rim 8.

Each tread plate 16 is yieldably maintained against the outer face of rim 8 by a stem 26 which extends through an opening 28 in rim 8 and a hole 30 in ring 14. These openings 28 and 30 form journals for stem 26 which permits longitudinal movement thereof, and since stem 26 is disposed radially as shown in Fig. 1, it is obvious that this movement will also be a radial movement.

One end of stem 26 is pivotally secured to tread plate 16 through the medium of a pin 32 which passes through opposed openings in the walls of housing 34. This housing 34 is formed so that it will serve as one of the cleats 18 to the extent that it will sink into the earth as the wheel travels. The other end of stem 26 is provided with means for adjustably tensioning a spring 36 that is coiled about stem 26. In this instance the means is simply a nut 38 in screw-threaded engagement with the threads 40 formed on that end of stem 25. A washer 42 may be used if desired and when the units are assembled, spring 36 is disposed between ring 14 and washer and nut 42 and 38 respectively.

The connection between stem 26 and plate 16 is substantially central between the ends of plate 16 and when the plates are not forced between the surfaces of the rod and rim 8, all of the plates are held in the position clearly shown in Fig. 1. A rocking motion may be imparted to all of these plates and when one or the other of the ends thereof approach rim 8, spring 36 is compressed and stem 26 moved outwardly.

The overlapping arrangement shown so clearly in Fig. 2 may be altered if desired, but this form embodies the requirement of the invention to the extent that a portion of one of the tread plates 16 will move in front of the end of the next adjoining plate to take the rod as the plate in front is pressed down to a substantially horizontal position, or, at any rate, into a plane the same as the lowermost end next adjoining tread plate 16. There is a clearance between tongue 22 and tongues 24 which is great enough to allow necessary lateral movement to the extent permitted by flanges 20, yet no striking at this point takes place.

Track laying wheels made in accordance with this invention will travel around sharp curves and smooth out exceptionally rough or soft ground in a most efficient manner. Any lateral tilting of the wheel from the normal vertical plane will likewise be allowed when tread plates 16 are on the road surface because springs 36 will be further compressed in event any tilting becomes necessary. Obviously, sufficient freedom between stem 26 and openings 28 and 30 is provided.

It is notable that the plurality of plates arranged around the rim of wheel 6 are each independent of any others and no interconnection other than the wheel rim 8 itself is used. Replacing of a broken plate could be quickly accomplished by simply removing nut 38 and sliding the entire assembly out of position. No endless tracks or objectionable links must be handled as has heretofore been the case. It is desirable to construct tread plates 16 of cast or forged metal and to make the other parts of the tread plate unit of strong, durable material which will withstand excessive strains.

This invention, however, does not limit the track laying wheel to any particular specific structural material or detail and any changes or modifications as might fairly fall within the spirit of the invention or scope of the appended claims are contemplated.

Having thus described the invention, what is claimed as new and desired to be secured by Letters Patent is:

1. A track-laying wheel comprising an annular continuous outer rim; an inner ring intermediate the axis of the wheel and said outer rim; and a plurality of tread plate units arranged around the rim of said wheel, each of said units comprising a substantially planar tread plate, a stem pivotally secured to the tread plate intermediate the ends of the latter and extending radially of the wheel through appropriate openings formed through the said outer rim and inner ring, screwthreads formed on the inner end of said stem, an adjusting member in screwthreaded engagement with the threaded end of said stem and a spring coiled about said stem and interposed between the adjusting member and inner ring, said outer rim and inner ring being relatively rigid and said spring and adjusting member being between the said inner ring and the axis of the wheel.

2. In a track-laying wheel having an annular continuous outer rim; and an inner ring intermediate the axis of the wheel and said outer rim; a plurality of tread plate units arranged around the rim of said wheel, each of said units comprising a substantially planar tread plate, a stem pivotally secured to the tread plate intermediate the ends of the latter and extending radially of the wheel through appropriate openings formed through the said outer rim and inner ring, screwthreads formed on the inner end of said stem, an adjusting member in screwthreaded engagement with the threaded end of said stem and a spring coiled about said stem and interposed between the adjusting member and inner ring, said stem being pivotally joined to said tread plate at a point spaced outwardly from its outer planar face.

3. A track-laying wheel comprising an annular continuous face; a series of independent, planar tread plates disposed against said face in end-to-end relation; and yieldable means to maintain each of said plates respectively against the said face comprising a radially extending stem and a spring coiled about the said stem and exerting radial inward pressure thereon, said stem being pivotally connected to the planar tread plate and means establishing said pivotal connection comprising an outwardly extending hollow cleat formed on the outer face of the tread plate and a cross pin extending through said hollow cleat, said stem having one end thereof within said cleat and pivotally engaged by said cross pin.

4. A track-laying wheel comprising an annular continuous face; a series of independent, planar tread plates disposed against said face in end-to-end relation; a plurality of cleats formed on the outer face of each plate respectively; a stem extending radially inwardly from each plate; and means exerting yielding inward pressure on each stem respectively, one of the cleats of each tread plate being hollow and having a cross pin extending therethrough, one end of said stem being pivotally engaged by said cross pin within the said hollow cleat.

HARRISON M. TURNER.